US009827512B2

(12) United States Patent
Malone

(10) Patent No.: US 9,827,512 B2
(45) Date of Patent: Nov. 28, 2017

(54) EMBEDDED INFLUENT DIFFUSER FOR FLOATING MEDIA FILTER

(71) Applicant: Ronald F. Malone, Baton Rouge, LA (US)

(72) Inventor: Ronald F. Malone, Baton Rouge, LA (US)

(*) Notice: Subject to any disclaimer, the term of this patent is extended or adjusted under 35 U.S.C. 154(b) by 0 days.

(21) Appl. No.: 15/339,219

(22) Filed: Oct. 31, 2016

(65) Prior Publication Data

US 2017/0043282 A1    Feb. 16, 2017

Related U.S. Application Data

(63) Continuation-in-part of application No. 14/730,057, filed on Jun. 3, 2015, now abandoned.

(51) Int. Cl.

| | |
|---|---|
| *B01D 24/28* | (2006.01) |
| *B01D 24/40* | (2006.01) |
| *B01D 24/46* | (2006.01) |
| *C02F 3/08* | (2006.01) |
| *C02F 3/06* | (2006.01) |
| *C02F 3/10* | (2006.01) |

(52) U.S. Cl.
CPC ........... *B01D 24/28* (2013.01); *B01D 24/40* (2013.01); *B01D 24/4636* (2013.01); *B01D 24/4673* (2013.01); *C02F 3/06* (2013.01); *C02F 3/087* (2013.01); *C02F 3/104* (2013.01)

(58) Field of Classification Search
CPC .... B01D 24/16; B01D 24/165; B01D 24/167; B01D 24/28; B01D 24/36; B01D 24/38; B01D 24/40; B01D 24/46; B01D 24/4626; B01D 24/4636; B01D 24/4652; B01D 24/4668; B01D 24/4684; B01D 24/4694; B01D 23/20; C02F 3/06; C02F 3/085; C02F 3/087; C02F 3/10; C02F 3/104; C02F 2203/006; C02F 2306/16
See application file for complete search history.

(56) References Cited

U.S. PATENT DOCUMENTS

| | | | | |
|---|---|---|---|---|
| 3,122,594 | A | * | 2/1964 | Kielback ................ B01D 47/14 |
| | | | | 261/94 |
| 3,424,674 | A | * | 1/1969 | Webber .................. B01D 24/28 |
| | | | | 210/189 |

(Continued)

FOREIGN PATENT DOCUMENTS

JP          9-10786 A       1/1997

OTHER PUBLICATIONS

PCT Application No. US2014/066647; International Search Report and Written Opinion of the International Searching Authority for Applicant Ronald F. Malone dated Mar. 19, 2015.

(Continued)

*Primary Examiner* — David C Mellon
(74) *Attorney, Agent, or Firm* — Jones Walker LLP

(57) ABSTRACT

A floating media filter including a filter housing having an influent inlet and an effluent outlet. A floating media is positioned in the housing and forms a static media bed when the filter is in a filtration stage. A diffuser trough is positioned in the filter housing such that the lower surface of the media bed, when the filter is in the filtration stage, is below the upper edge of the diffuser trough. A backwashing mechanism causes dispersion of the media bed during the backwashing stage.

20 Claims, 13 Drawing Sheets

(56) References Cited

U.S. PATENT DOCUMENTS

| | | | | |
|---|---|---|---|---|
| 4,076,625 A * | 2/1978 | Scholten | ............ | B01D 24/008 210/274 |
| 4,246,119 A * | 1/1981 | Alldredge | ............ | B01D 24/008 210/279 |
| 4,479,880 A * | 10/1984 | Treanor | ............ | B01D 24/12 210/274 |
| 4,515,691 A * | 5/1985 | Ida | ............ | B01D 39/02 210/274 |
| 4,547,286 A * | 10/1985 | Hsiung | ............ | B01D 24/002 210/274 |
| 4,800,021 A * | 1/1989 | Desbos | ............ | C02F 3/06 210/150 |
| 4,861,472 A * | 8/1989 | Weis | ............ | B01D 24/30 210/189 |
| 5,618,431 A * | 4/1997 | Kondo | ............ | C02F 3/06 210/618 |
| 5,770,080 A * | 6/1998 | Malone | ............ | C02F 3/06 210/151 |
| 5,932,092 A * | 8/1999 | Hawk | ............ | A01K 63/045 119/260 |
| 6,517,724 B1 * | 2/2003 | Malone | ............ | C02F 3/06 210/151 |
| 2003/0057152 A1 * | 3/2003 | Haridas | ............ | C02F 3/282 210/603 |
| 2005/0109697 A1 * | 5/2005 | Olivier | ............ | C02F 3/00 210/610 |
| 2009/0294356 A1 * | 12/2009 | Beggs | ............ | B01D 24/14 210/618 |
| 2015/0136667 A1 * | 5/2015 | Malone | ............ | C02F 3/087 210/108 |
| 2016/0075578 A1 | 3/2016 | Malone | | |

OTHER PUBLICATIONS

PCT Application No. US2016/035404; International Search Report and Written Opinion of the International Searching Authority for Applicant Ronald F. Malone dated Sep. 2, 2016.

* cited by examiner

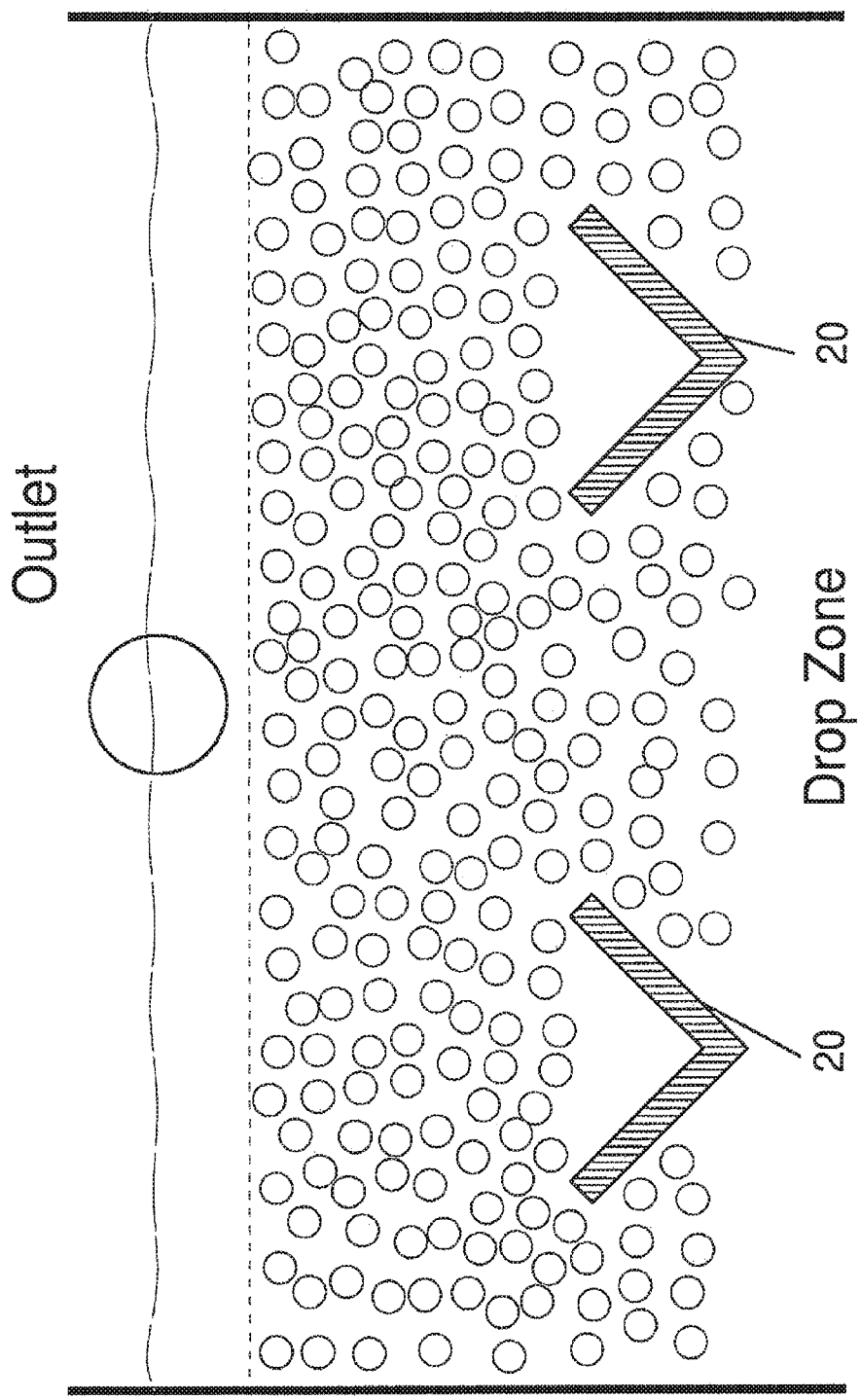

EMBEDDED INFLUENT DIFFUSER FOR FLOATING MEDIA FILTER

CROSS REFERENCE TO RELATED APPLICATION

This application is a continuation-in-part of U.S. application Ser. No. 14/730,057 filed on Jun. 3, 2015, which is incorporated by reference herein in its entirety.

BACKGROUND

The present disclosure relates to media filtration systems and in particular embodiments, techniques for reducing turbidity released from the bed immediately after backwashing.

Media filtration systems have become increasingly used in aquaculture, wastewater treatment, and other water treatment areas. In particular, air charged backwashing bioclarifiers employing floating media such as disclosed in U.S. Pat. No. 6,517,724 have proven to be a cost-effective system for treating water used in the above industries. However, the usefulness of such systems may be enhanced further with continued improvements, including enhancing movement of influent through the media bed.

SUMMARY OF SELECTED EMBODIMENTS

One embodiment is a floating media filter including a filter housing having an influent inlet and an effluent outlet. A floating media is positioned in the housing and forms a static media bed when the filter is in a filtration stage. A diffuser trough is positioned in the filter housing such that the lower surface of the media bed, when the filter is in the filtration stage, is below the upper edge of the diffuser trough. A backwashing mechanism causes dispersion of the media bed during the backwashing stage.

Another embodiment is a method of directing influent through a floating media filter. The floating media filter includes a filter housing having an influent inlet and an effluent outlet, floating media positioned in the filter housing, and a diffuser trough positioned in the filter housing. The method includes the steps of: (a) positioning a sufficient volume of floating media in the housing such that a media bed, formed when the filter is in a filtration stage, has a lower surface below an upper edge of the diffuser trough; (b) dispersing the media bed during a backwashing operation; and (c) continuing the filtration stage after the media bed has reformed with its lower surface below the upper edge of the diffuser trough.

Other embodiments are described or are apparent in the following disclosure and their omission from this Summary section should not be interpreted as a limitation on the scope of the present invention.

BRIEF DESCRIPTION OF DRAWINGS

FIG. 9 illustrates a modified diffuser trough arrangement.

DETAILED DESCRIPTION OF SELECTED EMBODIMENTS

Figure 1:
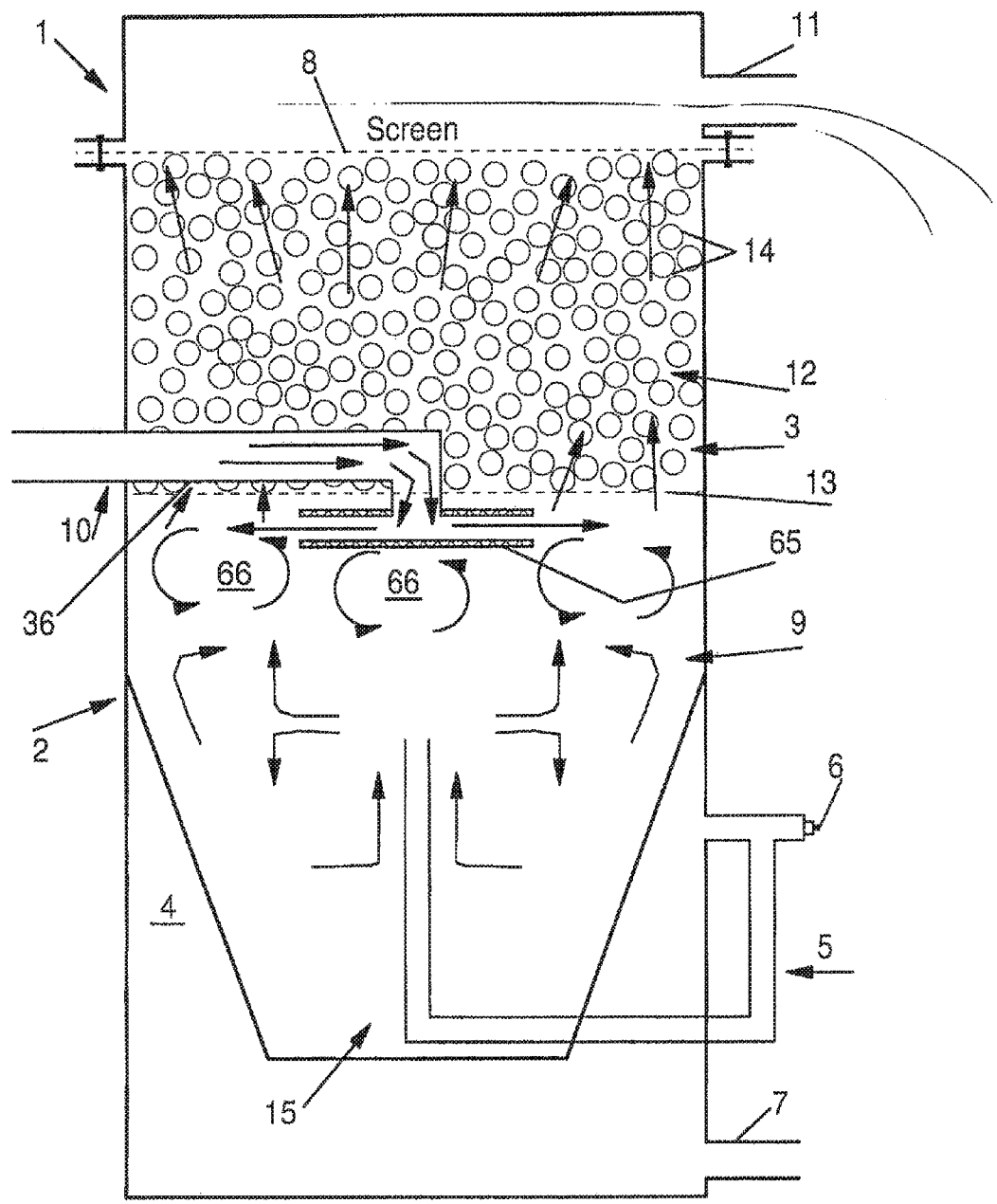
FIG. 1 illustrates a prior art media filter employing a double plate diffuser.

FIG. 1 shows a prior art floating media filter 1 which is generally formed of a filter housing 2 having an influent inlet 10, an effluent outlet 11, a volume constituting a filter chamber 3 (sometimes called a "filter zone"), and a volume constituting a drop zone 9 (sometimes also referred to as an "expansion zone"). A mass of floating media pellets or "beads" 14 form a floating media bed 12 in the space defining filter chamber 3. In many embodiments, a screen 8 is positioned below effluent outlet 11 to prevent beads 14 from moving with the effluent out of filter chamber 3 and escaping through outlet 11.

As is well known in the art, the general operational principle of floating media filters is to introduce influent beneath the media bed and allow the influent to pass upward through the media bed 12 to the outlet 11. Generally, substantially all (e.g., at least 95%) of the fluid volume entering the filter via the influent inlet(s) 10 departs the filter through the effluent outlet(s) 11. The FIG. 1 example includes an inlet extension pipe 36 which carries influent to a double plate diffuser 65 positioned below a lower surface 13 of media bed 12. The double plate diffuser 65 will introduce influent in a 360° radial pattern below media bed 12. Typically, this introduction of influent will create various eddy currents 66 beneath media bed 12 and into drop zone 9. Often the eddy currents 66 have the undesirable effect of keeping small solids, which would settle in more quiescent conditions, entrained in the drop zone 9. These entrained solids form a volume of "cloudy" water which tends to co-mingle with influent water under media bed 12.

After influent is introduced below the media bed 12, it will begin moving in a path through media bed 12. While passing through the media bed, the influent is subject to both physical solids filtration and biological treatment from micro-organisms adhering to the beads 14. During treatment, biological growth forms a film on and between the beads in media bed 12. Suspended solids being strained by media bed 12, as well as biomass, form a biofilm on the beads. During the filtration stage, the biofilm will over a period of time, tend to bridge from bead to bead, requiring periodic agitation of the media bed 12 (referred to as "dispersion" or "fluidization") to loosen biofilm and other solids for removal from the media bed. Such fluidization is achieved during a backwashing stage of operation using one of many different types of backwashing mechanisms.

FIG. 1 illustrates a filter with one backwashing mechanism 15. The backwashing mechanism of the FIG. 1 example is an air-washed, dropping bed mechanism having many similarities to that described in U.S. Pat. No. 6,517, 724, which is incorporated by reference herein in its entirety. In this backwashing mechanism, air accumulates in charge chamber 4 by the slow injection of air through air inlet 6. At some point, the air in charge chamber 4 will reach the bottom of air siphon 5, which will then be "triggered" and rapidly release air into the filter chamber 3. As air leaves charge chamber 4, water in drop zone 9 fills the charge chamber, causing media bed 12 to "drop" into the area of drop zone 9 while air is bubbling through the beads, thereby dispersing or fluidizing the media bed and dislodging accumulated biofilm. Thereafter, as influent replaces the water which has moved into charge chamber 4, the beads will rise back into filter chamber 3, as limited by screen 8, and reform the media bed 12.

One undesirable effect observed in many prior art filters relates to the movement of the cloud of entrained solids mentioned above during the backwashing stage. At the beginning of the backwashing stage, the dropping media bed creates the cloudy volume as both the beads and released solids move downward together. At the end of the backwash stage, the beads float upward reforming the media bed. As the bed moves upward toward the screen, the influent waters move downward filling the voids left by the rising beads. The volume of cloudy water remains in the drop zone. Thus, at the end of each backwash cycle, the now static bead bed is underlain by an observable volume of "dirty" appearing water. The relatively clean water now continues to enter the upper reaches of the drop zone through the diffuser placed just below the media bed. The influent waters then mix with dirty waters in the upper reaches of the drop zone prior to entering the bed, creating a layer of cloudy water as the fine solids capture abilities of the media bed are overwhelmed. The finer solids escape the bed and thereby create a noticeably "dirty burp" in the otherwise clean effluent flow. With a well-designed double plate diffuser the cloudiness in the effluent passes in less than a minute as the fine solids in the upper portion of the drop zone are diluted by the co-mingling influent waters. Although these short "burps" of "dirty" water are typically not significant from the standpoint of overall water quality performance, in many applications, such as ornamental pond and aquaculture, they are considered very undesirable aesthetically. Additionally, the "dirty burp" phenomenon prevents expansion of these filtration technologies into many applications requiring a consistently pristine effluent, such as swimming pools, subsurface micro-irrigation and drinking water treatment applications.

When media bed 12 has fully reformed against screen 8 and influent is flowing through the media bed, this may be referred to as the filtration stage or sometimes, the "steady-state" filtration stage. While some filtration effect may occur shortly prior to the media bed completely reforming, the "filtration stage" for purposes of this description begins when the media bed becomes substantially stationary against screen 8 in filter chamber 3. The filtration stage terminates when the backwash cycle begins. As seen in FIG. 1, in the filtration stage, the media bed 12 has an upper surface coincident with screen 8 and a lower surface 13. It will be understood that lower surface 13 is not necessarily a perfectly flat and stationary surface, but may have small irregularities depending on how individual media beads "stack" as the media bed reforms after backwashing and how the lower beads may discretely shift due to currents and other factors occurring below the media bed. Nevertheless, the bottom area of the media bed 12 will form a reasonably well defined lower surface during the filtration stage. Similarly, with the exception of some slight shifting of beads along the lower surface, the media bed is almost entirely static during the filtration stage. This is particularly true in regards to the portion of the media bed above the upper edge of the diffuser trough as seen in embodiments described below. In the filtration stage shown in FIG. 1, the upper surface 16 of the media bed forms against screen 8. The volume occupied by the media bed 12 during the filtration stage may sometimes be referred to as the filtration zone of the media filter. In preferred embodiments, at least 66% (including 70%, 75%, 80%, 85%, 90%, or 95%) of the media in the filter is positioned above the upper edge of the diffuser trough during the filtration stage. In many embodiments, the media beads are in a substantially homogenous configuration during the filtrations stage. In other words, the floating media bed lacks layers or striations of different sized media beads. If there are different sized media beads in the bed, the different sized beads are substantially uniformly distributed throughout the bed.

Figure 2:
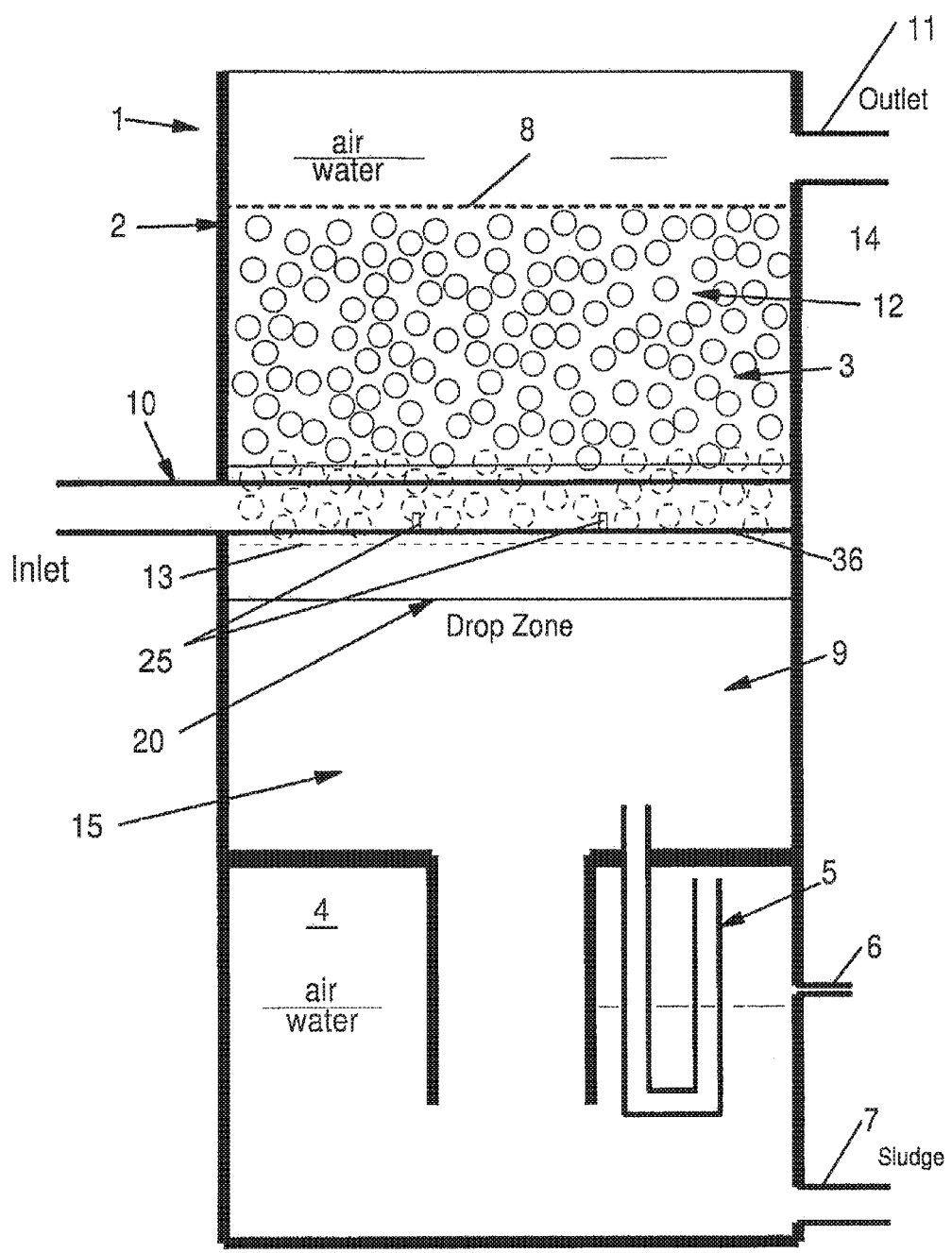
FIG. 2 illustrates a side sectional view of one floating media filter of the present invention.
Figure 3:
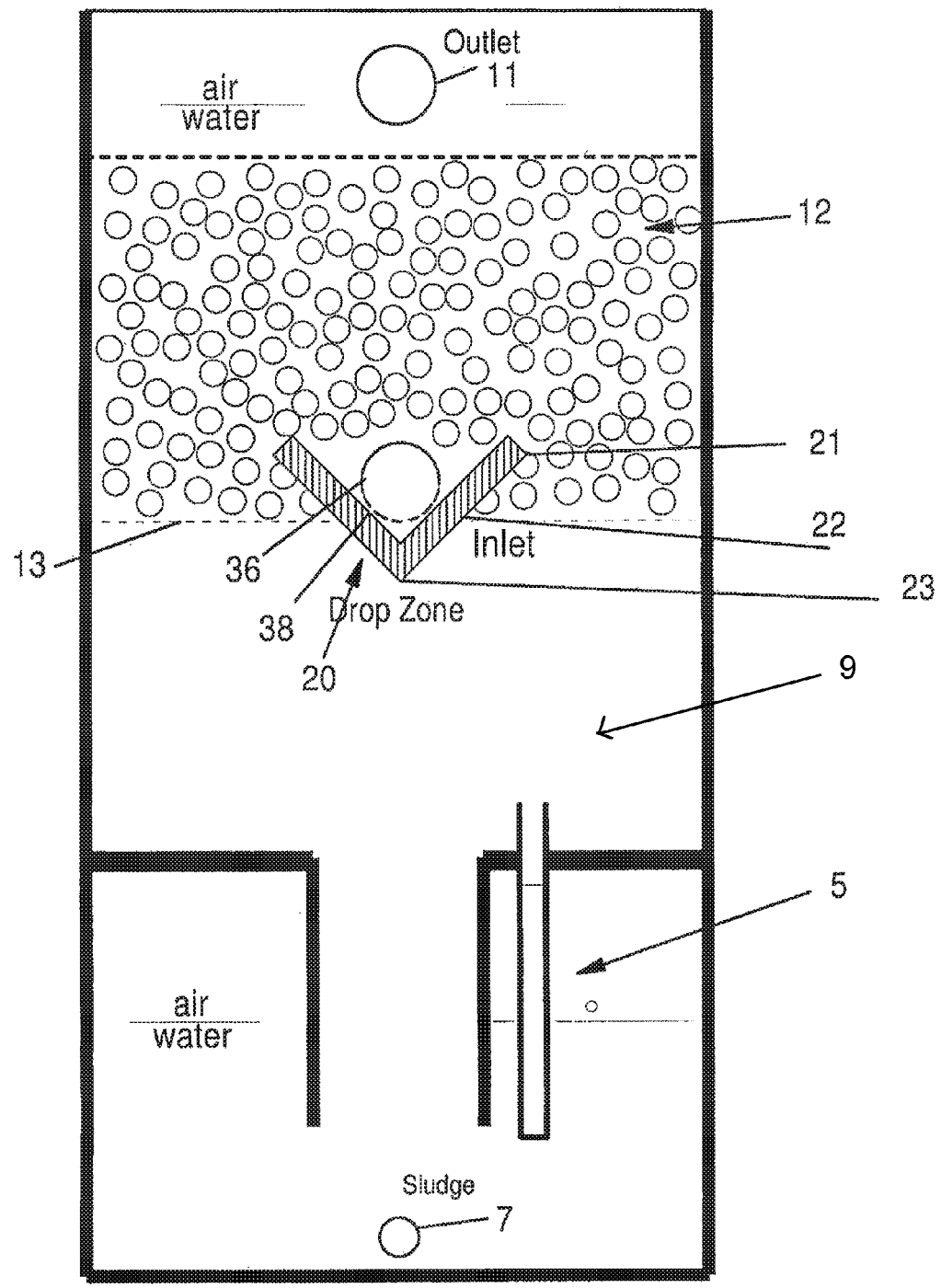
FIG. 3 illustrates the FIG. 1 view rotated 90°.

FIGS. 2 and 3 illustrate one embodiment of the present invention. FIG. 2 shows a floating media filter 1 that generally operates as described in reference to FIG. 1. However, in the FIG. 2 embodiment, media filter 1 includes a diffuser trough 20 extending across the width of filter chamber 3. An inlet extension pipe 36 is positioned in diffuser trough 20 and, in this embodiment, is co-extensive with diffuser trough 20. FIG. 3 is a section view rotated 90° from FIG. 2 and better shows the shape and position of diffuser trough 20. The distance between upper edge 21 and bottom edge 23 defines a height "$H_D$" of the diffuser trough 20 (see FIG. 7). In this embodiment, diffuser trough 20 is V-shaped with an upper edge 21, a midpoint 22, and a bottom edge 23. The inlet extension pipe 36 includes a series of apertures 38 which discharge influent against the inner surfaces of diffuser trough 20. In the FIGS. 2-3 embodiment, the lower surface 13 of media bed 12 (denoted schematically with a light dashed line in FIGS. 2 and 3) is at about the midpoint 22 of diffuser trough 20. Although FIG. 2 shows the diffuser trough 20 extending the entire width of filter housing 2, this is not necessary in all embodiments. The diffuser trough may extend less than the entire width of the filter housing. Likewise, many embodiments may not include influent extension pipe 36.

FIG. 3 also suggests how in media bed 12 will have a certain depth or thickness between the upper edge 21 of diffuser trough 20 and the upper surface 16 of media bed 12. The FIG. 3 embodiment indicates the depth above upper edge 21 is at least three times the trough height $H_D$ and more typically between about 5 to 15 times the height $H_D$. Alternatively, the portion of the media bed formed above the upper edge 21 of diffuser trough 20 during the filtration stage may be stated in terms of the percentage of the total media bed depth (i.e., the distance between media bed lower surface 13 and upper surface 16) above upper edge 21. Thus, FIG. 3 illustrates approximately 80% of the total depth of media bed 12 forming above upper edge 21. In alternative embodiments at least 50%, 60%, 66%, 70%, 75%, 80%, 90% or 95% of the total depth of the media bed 12 could be formed above upper edge 21 during the filtration stage.

Certain embodiments will also include specific ratios between the volume of the charge chamber and the drop zone or expansion zone. In the FIG. 3 embodiment, the expansion zone 9 is the volume below the lower surface 13 of the media bed and the lowest height in the filter which the beads may move downward (during the backwash cycle) without entering the charge chamber. As illustrative examples, some embodiments will have an expansion zone whose volume is less than four times the volume of the filter zone and more typically, between one and four times a volume of the filter zone. In more preferred embodiments, the expansion zone volume is between about 1.5 and 2.5 times the filter zone volume, or even 1.5 to 2. In these embodiments, the air charge chamber will be comparable in volume to the filter zone. Thus, in certain embodiments the ratio between the filtration zone, the expansion zone, and the charge chamber will be 1:1.5 to 2.5:1, respectively.

FIGS. 4-7 suggests the flow of influent in the filter during both the filtration stage and during backwash and bed reformation. These figures show a modified embodiment where the extension pipe 36 seen in FIGS. 2 and 3 has been removed. However, the influent flow characteristics described herein relative to the media bed are substantially the same with or without extension pipe 36.

Figure 4:
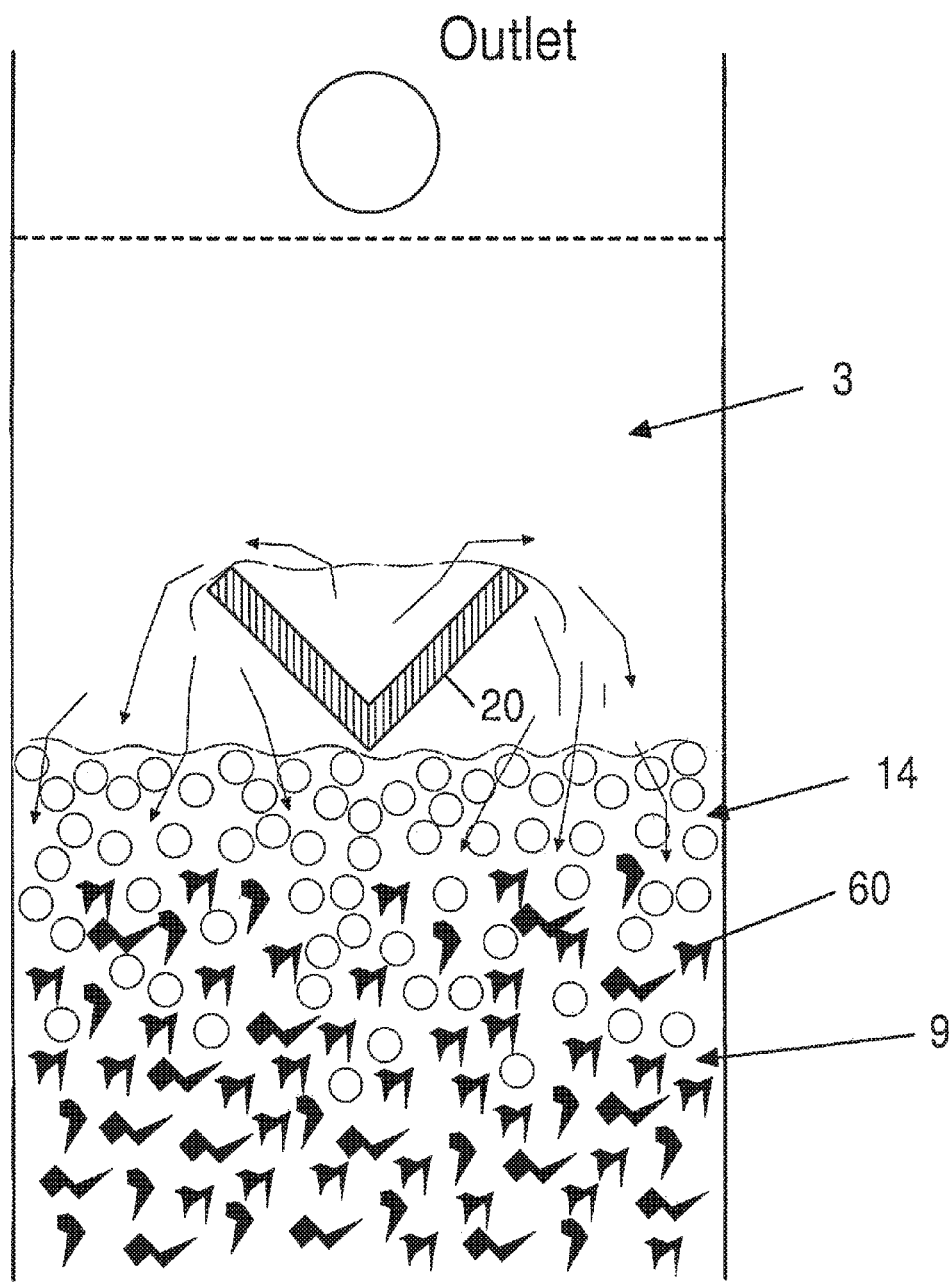
FIG. 4 illustrates the media bed at a lower level during the backwashing stage.

FIG. 4 shows the media beads 14 well into the backwash cycle. Typically during the backwash cycle, there is a lowering of at least a majority of the media bed below the upper edge of the diffuser trough which creates an air space in at least a substantial portion of the filter chamber or filter zone 3. The embodiment of FIG. 4 illustrates the fluid level and the media beads having lowered into the drop zone 9 below diffuser trough 20, i.e., the entire volume of the media bed has moved below the upper edge of the diffuser trough. Naturally, this also means the water level in the filter has dropped below the upper edge of the diffuser trough during the backwash cycle. Those skilled in the art will understand that as water moves downward, pressure at the influent inlet decreases, tending to cause an increased inflow of influent. At this point, influent flowing into the diffuser trough 20 quickly fills the trough and spills over onto the dispersed media beads 14. This downward flow of influent will further clean the media beads and tend to increase the separation between the media bed 14 and the floc particles 60 as the fluid level rises.

Figure 5:
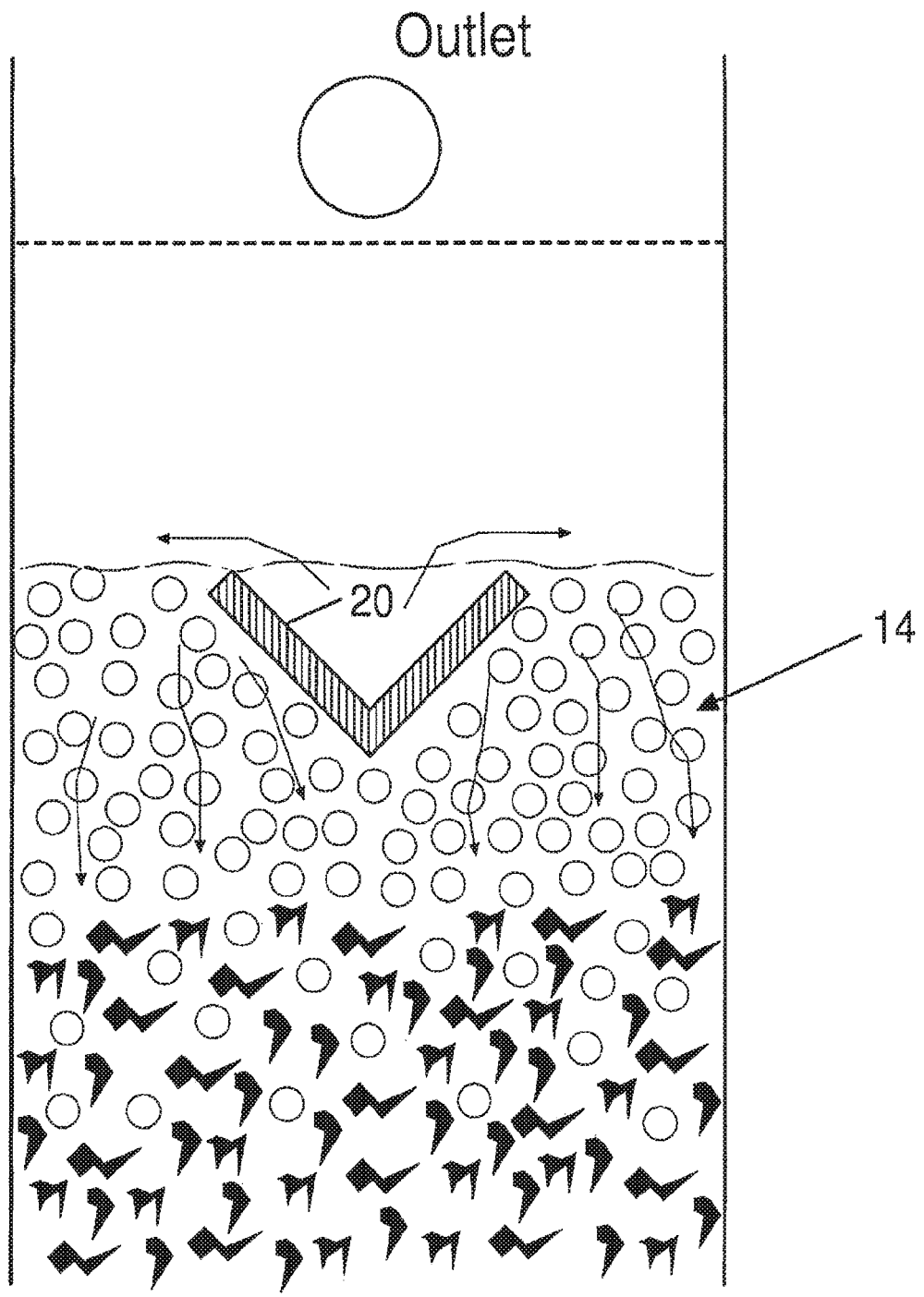
FIG. 5 illustrates the filter refilling and the media bed rising during the backwashing stage.

FIG. 5 shows the rising level of the media beads 14 as inflowing influent continues to raise the fluid level in the filter and continues to produce downward flow currents urging floating media upward as the floc particles (floc laden water) 60 remain suspended in the expansion chamber. Viewing FIG. 5 in conjunction with FIG. 6, it may be envisioned how, as the water level and media bed rise back around diffuser trough 20, the initial downward flow of relatively clean influent (i.e., cleaner than the floc laden water 60 now below the bed) will create a buffer zone 62 of cleaner water (see FIG. 6) between the lower surface of the media bed and the floc laden water 60.

During the backwash cycle, the influent overflowing the diffuser trough 20 acts as a water refill source. It will be understood that in the embodiments employing air-charged backwashing, water is not lost from the media filter during backwash, but is merely transferred to the charge chamber. The inflowing influent "refills" the media filter in the sense that the inflowing water raises the media bed back into the filtration zone. Of course, certain embodiments such as the hourglass filter in FIG. 11 do work on the principle of water leaving the filter during the backwash cycle and the refill source would be actually replacing the lost water in those embodiments. Influent flowing over the diffuser trough is not the only possible refill source and alternate embodiments could include a dedicated refill source positioned significantly above the diffuser trough, e.g., a structure such as the double plate diffuser 65 shown in FIG. 1 being positioned above diffuser trough 20 and acting as the refill source.

In many embodiments (but not necessarily all), the backwashing cycle is completed in less than 30 seconds (including any time period less than 30 seconds) and more preferably, in less than 15 seconds. In the air-charged backwashing embodiments, the backwashing cycle begins when the siphon triggers and ends when the media bed reforms in the filtration zone. Additionally, certain preferred air-charged backwashing embodiments have an air discharge period, i.e., a time period from triggering of air release until cessation of air release during the backwash cycle, of less than 20 seconds (including any time period less than 20 seconds), and more preferably, less than 5 seconds. Where a siphon 5 effectuates the air release, the air discharge period is controlled by the inner diameter of the siphon tube and height differential between the siphon inlet and outlet. The short air discharge period will allow media bed to fall comparatively rapidly below the diffuser trough 20 even though influent inflow is continuing during the backwash cycle and supplies water tending to raise the media bed. In other words, the transfer of water from the drop zone to the charge chamber at initiation of the backwash cycle greatly exceeds any influent inflow of water to the drop zone during the early portion of backwash cycle. This allows for there to be at least a short period of time during the backwash cycle when the entire media bed (or at least a substantial portion of the media bed) is below the upper edge of the diffuser trough.

Figure 6:
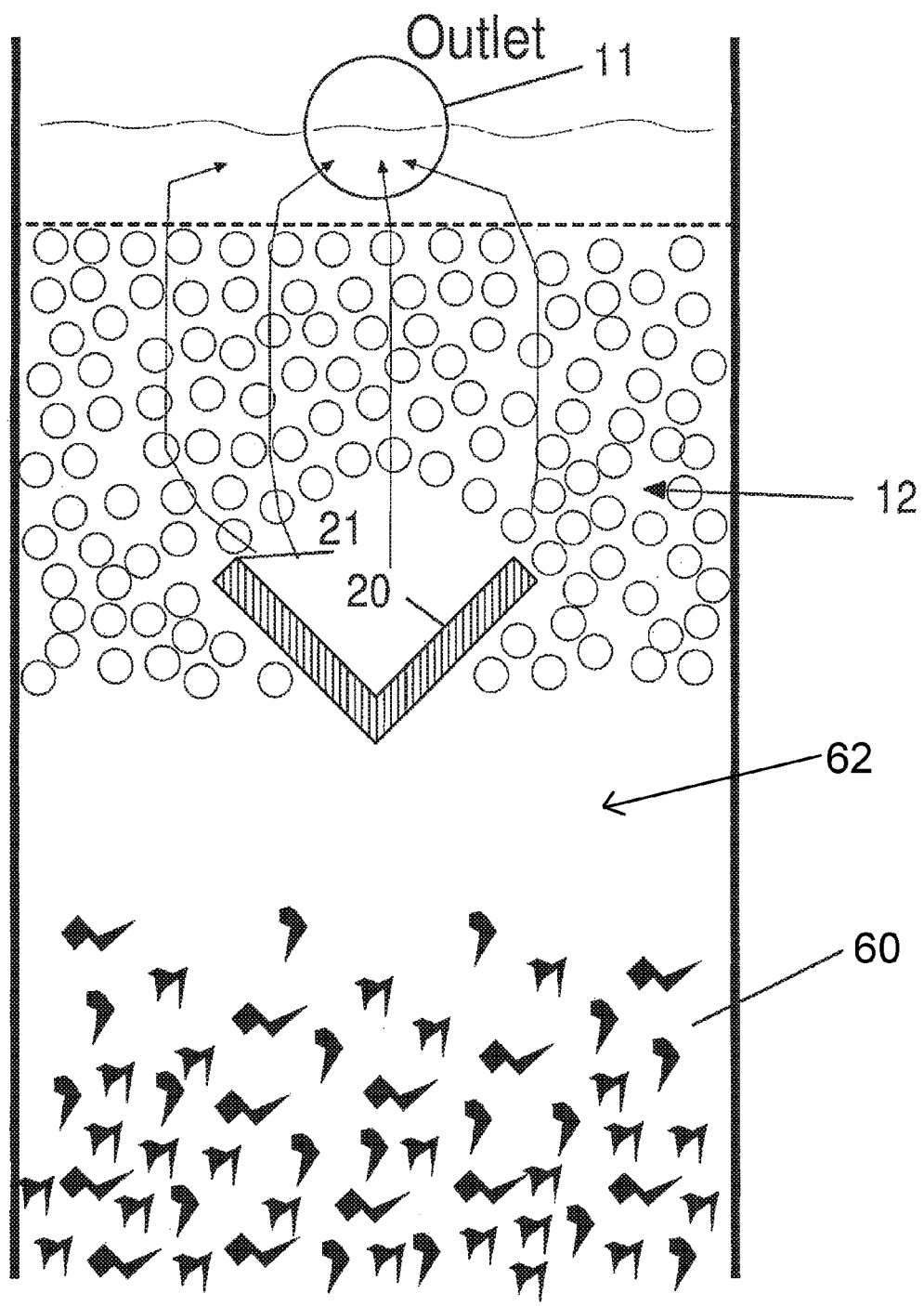
FIG. 6 illustrates the media bed reforming at the end of the backwashing stage and in the early phase of the filtration stage.

FIG. 6 shows the media bed 12 substantially reformed in an early filtration stage subsequent to backwashing. The illustrated flow arrows suggests how influent from diffuser trough 20 follows various paths through the media bed to the effluent outlet. At this early filtration stage, the flow path to effluent outlet 11 is fairly direct since the biofilm and solids have not yet accumulated sufficiently in the media bed so as to impede fluid flow. Likewise, heavier solids below the media bed are beginning to settle into sludge 60. Because influent is being directed from the inlet along the interior space of diffuser trough 20 and because of the upward projecting walls of the diffuser trough, it can be seen that the influent's path into the media bed is in the predominantly upward direction, i.e., "upward" being the direction opposing gravitational force. "Predominantly upward" means that at least a majority of the influent volume exits diffuser trough 20 at an angle of 45° or less relative to the vertical. However, this does not mean that the walls of diffuser trough 20 are necessarily at 45°, just that a majority of the flow is generally upward. Moreover, the eddy currents seen in FIG. 1 below the media bed in the prior art example are not present since virtually all flow is upward. Further, the buoyancy of beads lying between the upper edge 21 of the diffuser trough 20 and the lower surface 13 of the media bed 12 is sufficient to dampen any turbulence induced by the influent waters.

Figure 7:
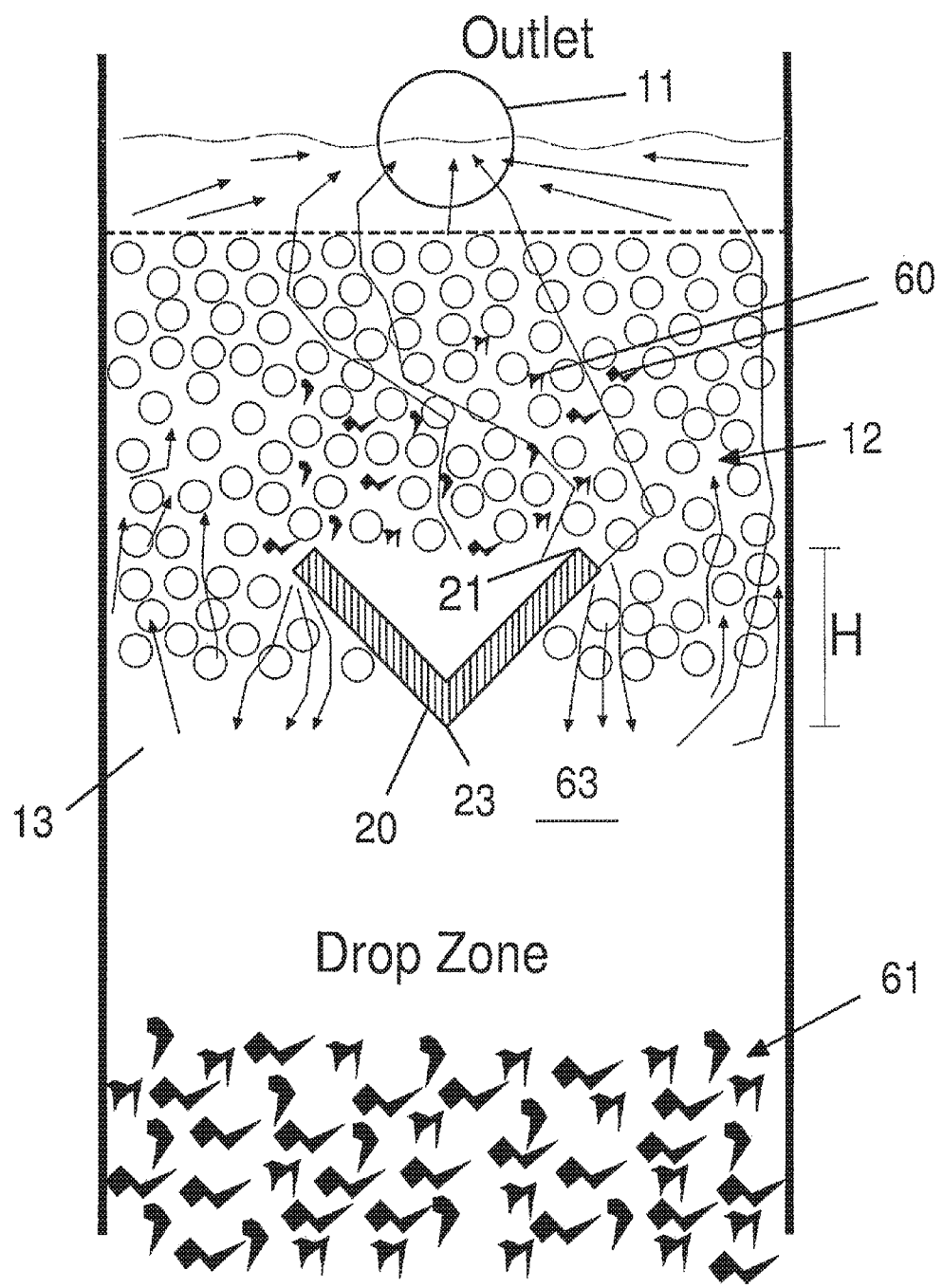
FIG. 7 illustrates the media bed in a later phase of the filtration stage.

FIG. 7 shows the media bed 12 later in the filtration stage. FIG. 7 suggests how the sludge at the bottom of the filter has become more consolidated. Likewise, floc and other particulate matter 60 begin accumulating in the space between media beads. As a result, the flow paths through the media bed become more indirect, including some flows 63 near diffuser trough 20 which move downward out the bottom of the bed before re-entering the media bed along the sides of the filter housing. However, even where flows 63 move out of the media bed, the flow velocity is not sufficient to produce substantial eddy currents. Thus, this media filter design does not tend to entrain solids below the media bed and as a result, does not produce the above described "burp" of "dirty" water as in certain prior art filters. FIG. 7 also shows the lower surface 13 of media bed 12 is at the bottom edge 23 of diffuser trough 20. However, in other embodiments the lower surface 13 is at (or below) the midpoint 22 of diffuser trough 20 (see FIG. 3) or just below upper edge 21 of diffuser trough 20 or well below the bottom edge 23 of the diffuser trough 20. In certain embodiments, the lower surface 13 of the media bed 12 will be no lower than two times $H_D$ below the bottom edge 23 of the diffuser trough 20. However, this is not necessarily a limitation in all embodiments.

Figure 8A:
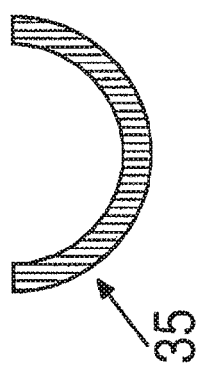
FIGS. 8a to 8f illustrate alternative diffuser trough configurations.

FIGS. 8a to 8f illustrate a few nonlimiting examples of diffuser trough cross-sectional shapes. FIG. 8a shows the V-shaped cross-section 30 seen in earlier figures. The legs of the "V" seen in FIG. 8a are at approximately 45° from the vertical or in other words, the internal angle alpha of the V is 90°. However, in other embodiments, the internal angle could be shallower (e.g., anywhere from 90° to 170°) or steeper (e.g., 60°). FIG. 8a shows the diffuser trough height "$H_D$," which in certain embodiments may be between about 3" and about 12," but in other embodiments could be less than or greater than this range depending on the scale and flow requirements of the unit.

It will be understood that as long the internal angle is less than 180°, then the diffuser trough is configured such that all flow exiting the diffuser trough has at least some vertical component at a point of exiting the diffuser trough. In other words, there is no flow path exiting the diffuser trough that is purely horizontal (or below horizontal)—all flow paths have some upward component. For example, FIG. 6 shows multiple flow paths 18 exiting diffuser trough 20. Flow path 18a is completely vertical, while flow path 18d includes both a vertical and horizontal component. It may be envisioned that even where the internal angle of diffuser trough 20 is 170°, flow path 18d still has some vertically upward component. No flow path exiting the diffuser trough is completely horizontal or has any downward component. As suggested in FIG. 7, there may be flow paths through the filter bed which have a downward component, but this is flow which has already exited the diffuser trough and is directed downward by clogging of the media bed. At the point of exiting the diffuser trough, all flow has at least some upward component.

Figure 8B:
Figure 8C:
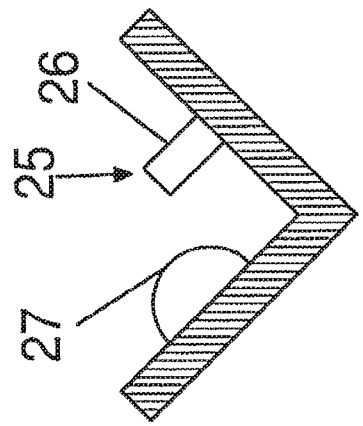

FIG. 8b shows a rectangular cross-section 31 while FIG. 8c shows a curved or semicircular shaped cross-section 35. Either of cross-sections 31 or 35 may be considered "U-shaped." In FIG. 8b, it is not necessary for the cross-section to be square, and the base segment of the trough could be shorter or longer than the upstanding leg segments of the trough. Likewise, the FIG. 8c cross-section need not be perfectly semicircular (i.e., have a constant radius), but could be parabolic in shape. The common feature in the cross-sections 30, 31, and 35 is that they will be oriented in the filter housing in a manner to direct influent flow in a predominantly upward direction into the media bed. The cross-sectional area of the trough is adjusted with flowrate such that the trough velocities are low enough to avoid fluidization of the overlying beads. Inlet trough horizontal velocities (typically in the range of 0.5 to 3 feet per sec) are also dependent on trough length. It is observed that the trough horizontal velocity falls with length as water moves vertically into the media bed. Longer troughs are less susceptible to momentum induced turbulence at the trough's terminal end, and can tolerate higher initial horizontal trough velocities.

Figure 8D:
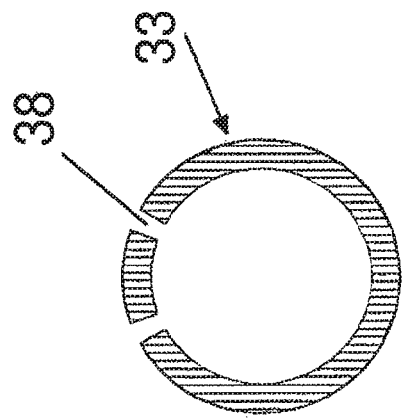

FIG. 8d suggests how the diffuser trough may be a pipe 33 with apertures 38 formed in the upper half of the pipe wall. Again, this will tend to direct influent in an upward orientation toward the media bed. Naturally, the orientation and spacing of the apertures in the upper half of the pipe wall can vary considerably from one embodiment to another.

Figure 8E:
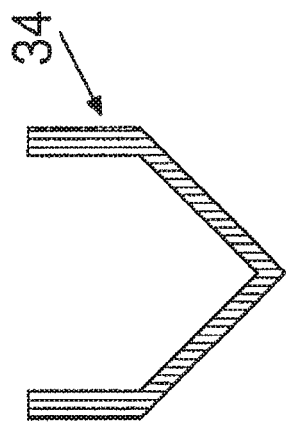
Figure 8F:
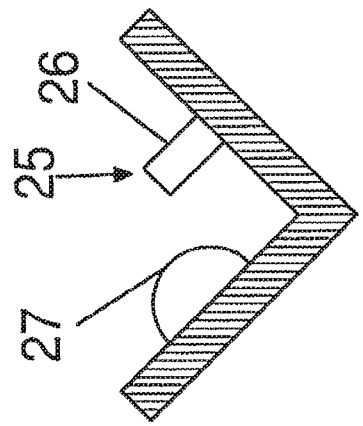

FIG. 8e shows how the diffuser trough may take an irregular shape or a shape that is a combination of earlier described shapes. FIG. 8f illustrates that certain embodiments of the diffuser trough will have baffles 25 along its length converting the velocity driven momentum to a localized pressure to encourage vertical flow into the media bed near the baffle's location. It is often advantageous to avoid having the influent stream reach the housing wall opposite inlet 10 with too much velocity. Excessive water velocity at this location could be disruptive to the media bed at this locality. Baffles have been found to be effective at mitigating high horizontal inlet trough velocities particularly for short troughs that are prone to momentum induced erosion on the terminal end. The baffles 25 could take on any number of shapes, including upstanding legs 26. Baffles 25 could also take the shape of surface irregularities 27 on the inner wall of the diffuser trough. Virtually any structure along the surface of or in the cross-sectional area of the diffuser trough may serve as baffles as long as the structure slows the velocity of influent (along the length of the diffuser) while increasing the tendency of the influent waters to flow vertically without eroding the media bed.

Figure 10:
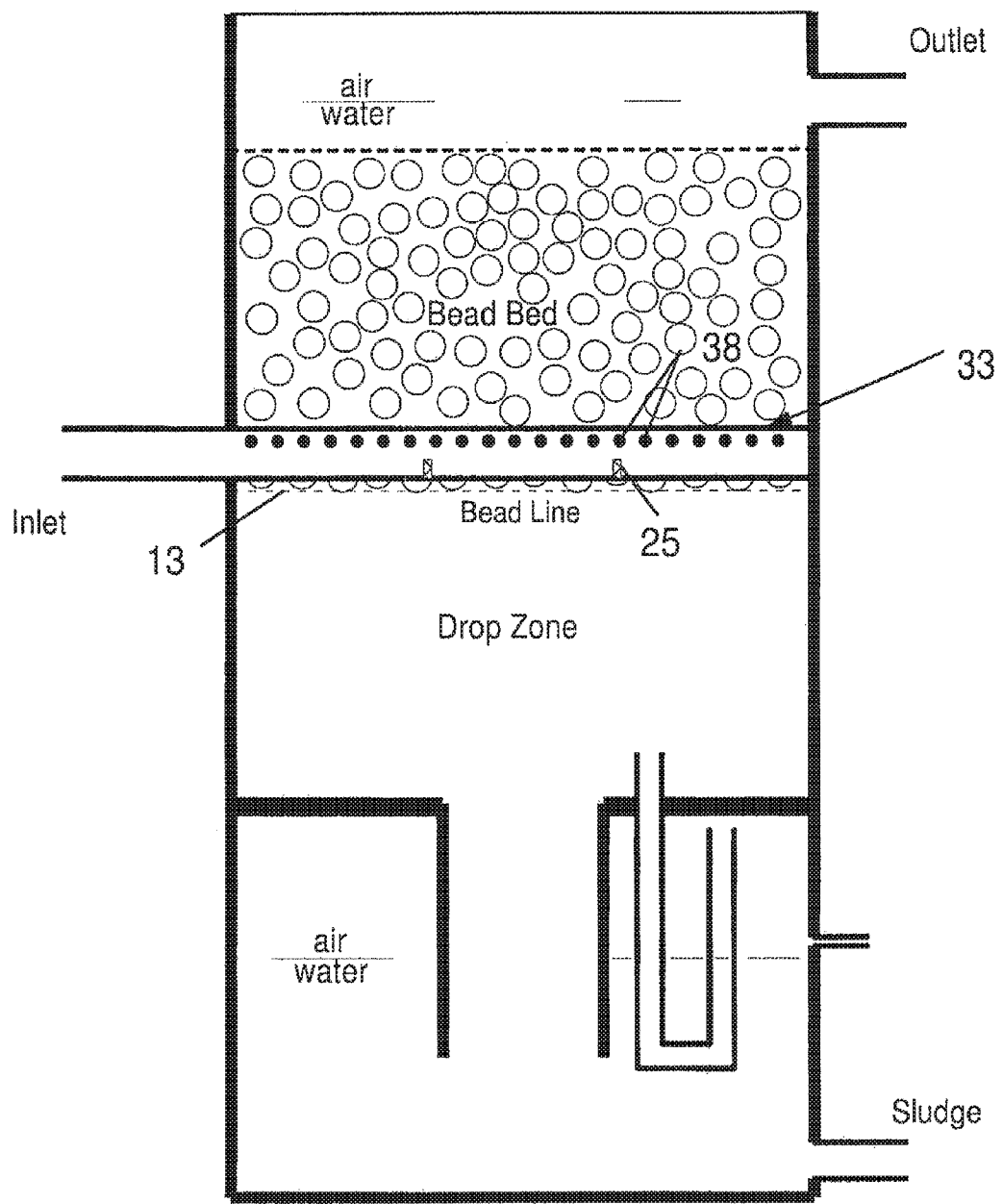
FIG. 10 illustrates a pipe based diffuser trough arrangement.
Figure 11:
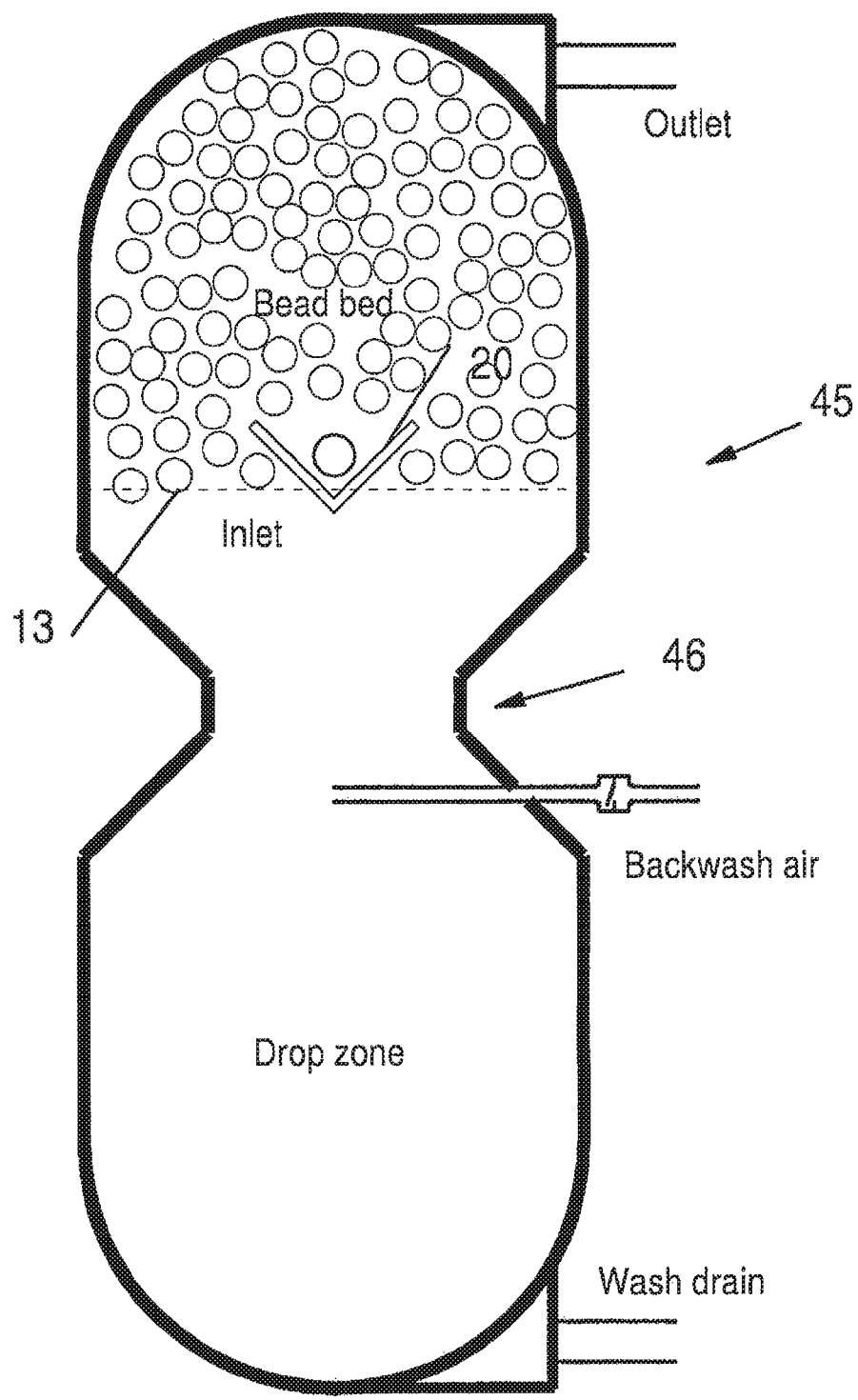
FIG. 11 illustrates a diffuser trough in an "hour-glass" type floating media filter.
Figure 12:
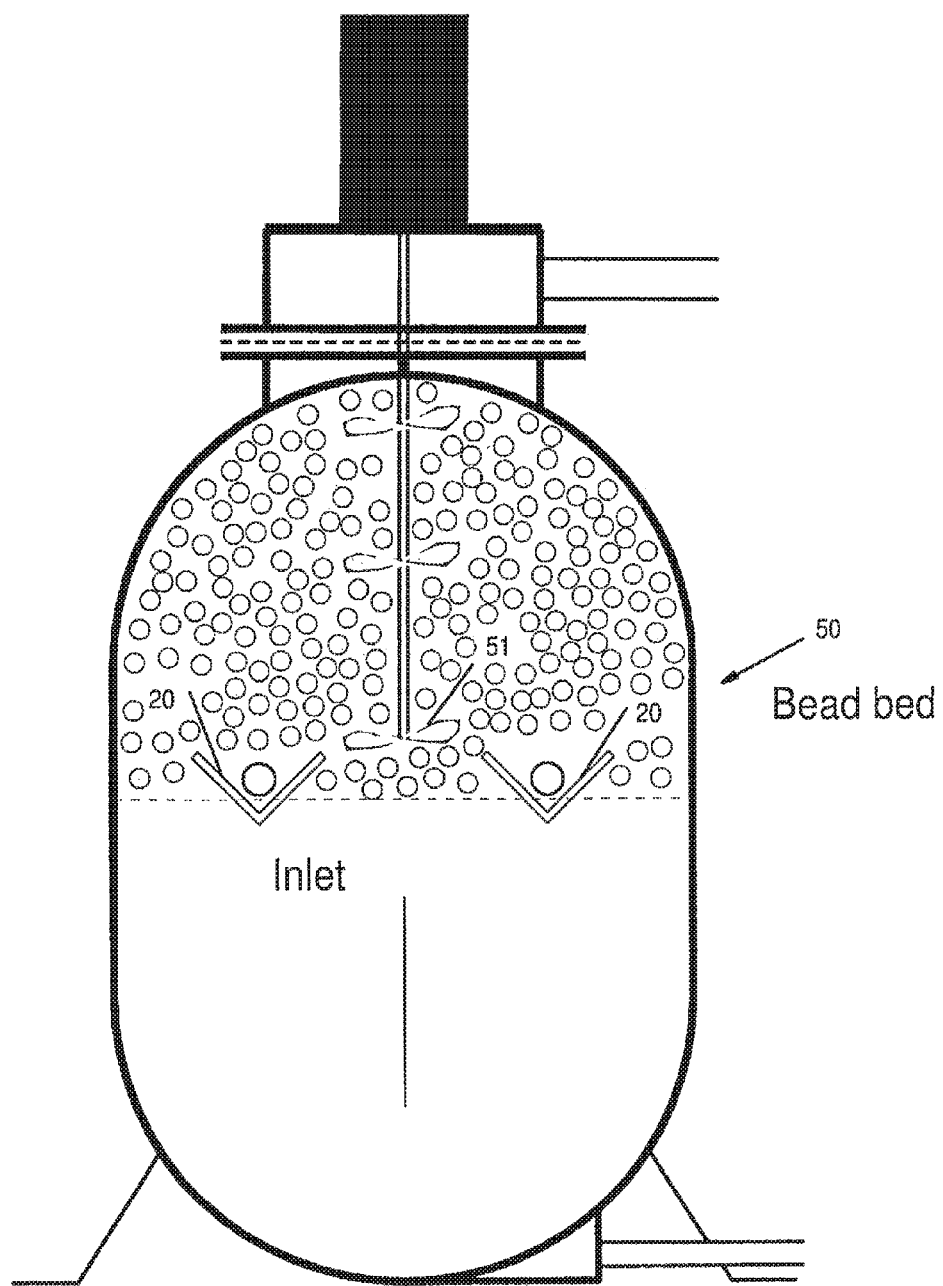
FIG. 12 illustrates multiple diffuser troughs in a "propeller-wash" type floating media filter.

FIG. 9 suggests how different embodiments could have multiple diffuser troughs 20, typically one trough being associated with each influent inlet opening into the filter housing. FIG. 10 shows a side sectional view of a media filter having a diffuser trough formed of circular pipe 33 with upwardly directed apertures 38 and baffles 25. The lower surface 13 of the media bed is shown just below circular pipe 33, but lower surface 13 could be as high as just beneath apertures 38. FIG. 11 illustrates an "hour-glass" type floating media filter such as disclosed in U.S. Pat. No. 5,232,586, which is incorporated by reference herein in its entirety. As explained in U.S. Pat. No. 5,232,586, the backwashing principle operates through the constricted throat 46 in the filter housing below the media bed and a valve allowing discharge of sufficient liquid to cause a rapid drop of the media bed into the throat. The FIG. 11 embodiment shows the lower surface 13 of the media bed (during the filtration stage) just above the bottom edge of diffuser trough 20. FIG. 12 shows two diffuser troughs 20 positioned in a "propeller wash" type of floating media filter such as disclosed in U.S. Pat. No. 5,126,042 which is incorporated by reference herein in its entirety. The backwash mechanism in propeller wash filters involves at least one propeller 51 positioned in the filter housing and rotated with sufficient speed to disperse the media bed. Although not shown in the figures, a related backwash mechanism is a "paddle wash" floating media filter such as seen in U.S. Pat. No. 5,445,740, which is incorporated by reference herein in its entirety.

Figure 13:
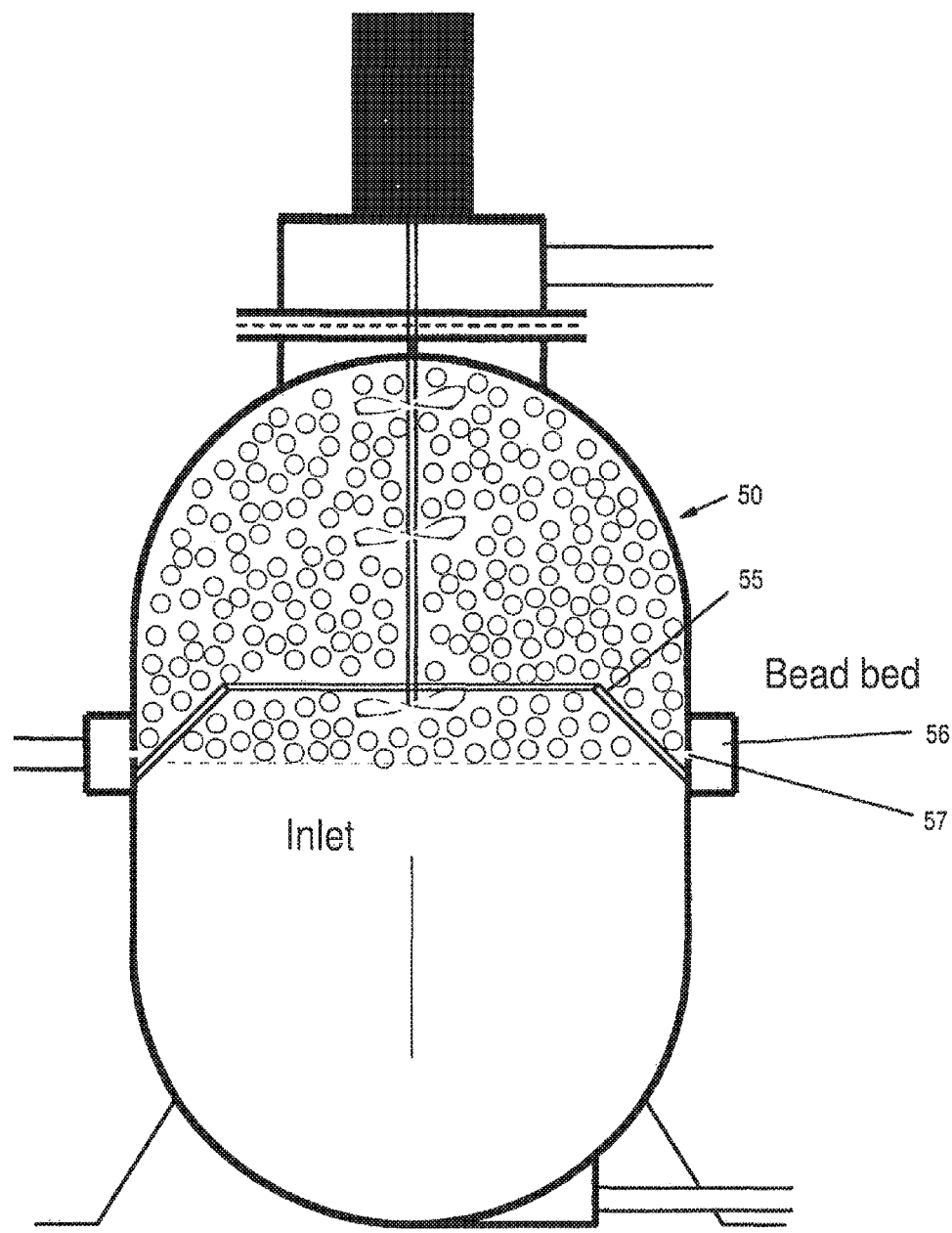
FIG. 13 illustrates a peripheral diffuser trough arrangement.

FIG. 13 illustrates a propeller wash type media filter having a peripheral diffuser trough 55. It can be envisioned how peripheral diffuser tough 55 forms a conical frustum shape with an open center portion. The filter housing will include the exterior circumferential feed channel 56 which receives influent flow and distributes the influent to a series of filter housing inlet apertures 57, which are also formed around the circumference of the filter housing. The open center portion of the peripheral diffuser trough enhances backwashing in propeller wash embodiments allowing the extension of propellers at or below the diffuser trough and lessening interference with the movement of media beads in response to propeller generated dispersion forces.

Although many aspects of the invention have been described in terms of certain specific embodiments illustrated above, many modifications and variations will be obvious to those skilled in the art to which the invention pertains. All such modifications and variations are intended to come within the scope of the following claims.

I claim:

1. A floating media filter comprising:
   a. a filter housing having an influent inlet connected to a source of waste water, the influent inlet being positioned below an effluent outlet;
   b. a floating media positioned in the filter housing and forming a media bed when the filter is in a filtration stage, the media bed having a lower surface and an upper surface defining a filtration zone between the lower and upper media bed surfaces during the filtration stage;
   c. a diffuser trough including an upper edge, the diffuser trough positioned in the filter housing such that (i) the lower surface of the media bed, when the filter is in the filtration stage, is below the upper edge of the diffuser trough, and (ii) the influent inlet feeds directly into the diffuser trough, thereby directing inlet flow in a path substantially along an interior length of the diffuser trough;
   d. a backwashing mechanism, which during a backwashing stage, causes (i) lowering of the upper surface of the media bed to a point below the upper edge of the diffuser trough, and (ii) creation of an air space in a substantial portion of the filtration zone; and
   e. a water refill source flowing from at or above the upper edge of the diffuser trough as the upper surface of the media bed reaches the point below the upper edge of the diffuser trough, thereby creating a downward flow of water displacing the media upwards.

2. The media filter of claim 1, wherein during the filtration stage, at least two-thirds of the media bed is positioned above the upper edge of the diffuser trough.

3. The media filter of claim 2, wherein during the filtration stage, a portion of the media bed above the upper edge of the diffuser trough is static.

4. The media filter of claim 1, wherein the filter housing is configured such that at least 95% of the fluid volume entering via the influent inlet departs the filter through the effluent outlet.

5. The media filter of claim 4, wherein during the backwash stage, influent water overflows the diffuser trough and spills onto media below the upper edge of the diffuser trough.

6. The media filter of claim 1, further comprising a charge chamber releasing air into the filtration zone during the backwashing stage, wherein a time period from triggering of air release until cessation of air release during the backwashing stage is less than 5 seconds.

7. The media filter of claim 1, wherein the filter housing further comprises (i) a charge chamber selectively storing and releasing air, and (ii) an expansion zone located between the filtration zone and the charge chamber, wherein a volume of the expansion zone is less than four times a volume of the filtration zone.

8. The media filter of claim 7, wherein the expansion zone volume is about 1.5 to about 2 times the filtration zone volume.

9. The media filter of claim 7, wherein during the backwashing stage, the lowering of the media bed is sufficiently rapid such that the waste water inflow rate does not prevent the media bed from lowering below the upper edge of the diffuser trough.

10. The media filter of claim 9, wherein the expansion zone volume is about 1.5 to about 2.5 times the filtration zone volume.

11. The media filter of claim 1, wherein the floating media bed lacks multiple layers formed by different sized media in each layer.

12. The media filter of claim 1, wherein the diffuser trough has a height and a midpoint on the height, and wherein the lower surface of the media bed during the filtration stage is between (i) the midpoint of the diffuser trough and two times the trough height below a bottom of the diffuser trough.

13. The media filter of claim 1, wherein the refill source is the waste water filling the diffuser trough and spilling over the upper edge of the diffuser trough.

14. The media filter of claim 1, wherein an inflow rate of the waste water does not substantially decrease during an entire period of the backwashing stage.

15. A floating media filter comprising:
   a. a filter housing having an influent inlet connected to a source of waste water, the influent inlet being positioned below an effluent outlet;
   b. a floating media positioned in the filter housing and forming a media bed when the filter is in a filtration stage, the media bed having a lower surface and an upper surface defining a filtration zone between the lower and upper media bed surfaces during the filtration stage;
   c. a diffuser trough including an upper edge, the diffuser trough positioned in the filter housing such that (i) the lower surface of the media bed, when the filter is in the filtration stage, is below the upper edge of the diffuser trough, and (ii) the influent inlet feeds directly into the diffuser trough, thereby directing inlet flow in a path substantially along an interior length of the diffuser trough;
   d. a backwashing mechanism including a charge chamber with a gas inlet connected to a source of gas and a trigger for periodically releasing the gas into the filtration zone at a gas discharge rate;
   e. wherein the backwashing mechanism is configured to (i) lower the media bed until the upper surface of the media bed is below the upper edge of the diffuser trough, and (ii) allow a continuous inflow of waste water to overflow the diffuser trough and spill onto the upper surface of the media bed.

16. A floating media filter comprising:
   a. a filter housing having an influent inlet connected to a source of waste water, the influent inlet being positioned below an effluent outlet;
   b. a floating media positioned in the filter housing and forming a media bed when the filter is in a filtration stage, the media bed having a lower surface during the filtration stage;
   c. a diffuser trough including an upper edge, a height and a midpoint on the height, and wherein (i) the lower surface of the media bed during the filtration stage is between the midpoint of the diffuser trough and two times the trough height below a bottom of the diffuser trough, and (ii) the influent inlet feeds directly into the diffuser trough, thereby directing inlet flow in a path substantially along an interior length of the diffuser trough; and
   d. a backwashing mechanism, which during a backwashing stage, causes substantial lowering of at least a majority of the media bed below the upper edge of the diffuser trough.

17. The media filter according to claim 16, wherein during the filtration stage, at least two-thirds of the media bed is positioned above the upper edge of the diffuser trough.

18. The media filter according to claim 16, wherein during the backwashing stage, a water level supporting the media in the filter housing drops to or below the upper edge of the diffuser trough.

19. The media filter according to claim 18, wherein during the backwashing stage, influent water overflows the diffuser trough and spills onto media below the upper edge of the diffuser trough.

20. The media filter according to claim 16, wherein substantially all of the media moves below a bottom of the diffuser trough during the backwashing stage.

* * * * *